United States Patent [19]

Moore

[11] Patent Number: 5,560,478
[45] Date of Patent: Oct. 1, 1996

[54] READY-TO-USE COPPER PIPE NIPPLE APPARATUS

[76] Inventor: Lovell C. Moore, P.O. Box 642594, San Francisco, Calif. 94164-2594

[21] Appl. No.: 274,910

[22] Filed: Jul. 14, 1994

Related U.S. Application Data

[63] Continuation-in-part of Ser. No. 978,909, Nov. 19, 1992, abandoned.
[51] Int. Cl.$^6$ ..................................................... B65D 81/20
[52] U.S. Cl. .................................... 206/207; 206/213.1
[58] Field of Search ................................... 206/205, 207, 206/213.1, 349, 524.1, 524.4, 524.8

[56] References Cited

U.S. PATENT DOCUMENTS

| | | | |
|---|---|---|---|
| 1,713,558 | 5/1929 | Schollmeyer | 206/213.1 X |
| 2,118,073 | 5/1938 | Dittmeyer | 138/96 R |
| 4,066,401 | 1/1978 | Solomon | 206/207 X |
| 4,314,717 | 2/1982 | Bjurman | 285/390 |
| 4,815,715 | 3/1989 | Ganson et al. | 266/268 |
| 5,275,670 | 1/1994 | Smialek et al. | 136/236.1 |

*Primary Examiner*—Jacob K. Ackun

[57] ABSTRACT

A nonferrous nipple fitting apparatus and of the type that is preserved for future use in the field of plumbing. The nipple having two clean, xerotic surface recess fitting sections on its outer wall. A volume of inert gas has precluded oxidation of the recess fitting sections by surrounding the segment to be made into a nipple, before the fitting sections are established on the wall surface of the segment. A gas-impermeable bag surrounds the nipple and the volume of inert gas, after recess fitting sections are established on the pipe's wall surface within that volume. The apparatus provides a nonferrous pipe nipple fitting for solder-bonding, having clean, dry surface recess fitting sections that are preserved for future use. The preserved nipple fitting has a physical structure that will achieve a more reliable and complex textural integration when solder-bonded to corresponding fittings, when compared to any prior art (fittings) considered to be preserved in a state of material readiness.

3 Claims, No Drawings

READY-TO-USE COPPER PIPE NIPPLE APPARATUS

BACKGROUND-CROSS REFERENCE TO RELATED APPLICATION

This is a continuation-in-part of Ser. No. 07/978,909, Filed Nov. 19, 1992, and now abandoned.

BACKGROUND-FIELD OF INVENTION

This invention relates to copper pipe and corresponding copper pipe fittings, specifically copper pipe nipples which are for use in plumbing.

BACKGROUND-DESCRIPTION OF PRIOR ART

Nipples are short pieces of (usually) standard pipe with male fittings (usually pipe threads) on each end. When the pipe fittings run together at the center, the term "close nipple" is used; if a small amount of the exterior surface of the pipe is left in the center, the name "short nipple" is used. Longer nipples are classified as "long" and "extra long", with the latter varying from four inches to one foot, the length usually graduating by even inches. Nipples are known to be manufactured for joining with either right-hand or right- and left-hand female fittings (usually threads).

Malleable iron pipe is cut into nipple-size pieces and is threaded on each end, thus yielding malleable iron pipe nipples. In other words if the pipe wasn't cut to one-foot lengths or less and no male fittings were provided on it, the pipe would simply be pipe pieces. Threads are die-cut ridges on the surface of a pipe or fitting wall, on most male pipe fittings, coincided by helical recesses for correspondence.

One type of pipe nipple is shown as U.S. Pat. No. 4,314,717 to Bjurman (1982) and is made of plastic, apparently for flexibility.

A U.S. patent to Dirtmeyer (1938) is for a method that discloses what some skilled in the art recognize as a copper pipe nipple that is ready to solder. However, the product of Dittmeyer's method lacks any facial recess on the outer wall surface of a nonferrous pipe or tube, in the fitting areas. Such recesses are formed on nonferrous solder fittings by marring or scratching the wall surfaces to be joined, in the fitting areas. This procedure is accomplished by rubbing the fitting surface to be joined with emery cloth or a wire brush.

Recesses on the walls of fittings such as nipples provide interfacial voids that ensure proper joining and bonding strength. Recesses in effect help catch and fasten a nipple to other corresponding fittings, including solder fittings that are joined with the aid of bonding agents such as molten solder. Molten solder fills the voids or recesses, thereby completing a more complex textural integration at the joint of the fittings.

Dittmeyer shows a pipe or tube having a cellulosic material heat-shrunk onto its outer wall at the ends of the tube. The cellulosic material has apparently been impregnated with a chemical having the properties of paste flux acid. Dittmeyer adds a disc onto the ends of the tube and under the cellulosic material, supposedly to protect the closure formed by the material. This was all done in an effort to cleanse and preserve the surface of a nonferrous tube, and form a solder fitting. While discussing the removal of impurities from the surface of a nonferrous tube, Dittmeyer (p. 1, 1.55) states, "the seal itself will absorb them".

Since Dittmeyer relied upon absorbent material to remove impurities from the surface of a nonferrous pipe, his teachings are to avoid marring, scratching, or injuring the (nonferrous) pipe. Consequently, the Dirtmeyer invention suffers from a number of disadvantages:

(a) The Dirtmeyer invention lacks any inherent recess component which would ensure a reliable textural integration when solder bonding to corresponding fittings. Structural pipefitters on construction jobs would find it necessary to form the necessary recesses on the fitting areas of the Dittmeyer tube or pipe, in order to ensure a strong and reliable solder bond.

(b) Dirtmeyer employs a fitting closure which operates at the mercy of the following impurity/air volume exchange: If impurity molecules are absorbed into Dittmeyer's closure material, the impurity molecules will displace any air/gas molecules from spaces available to receive the impurity molecules. The closure material will eventually become saturated with impurity molecules. This exchange activity will eventually cause existing impurity molecules to reside in the fitting area of the tube or pipe, directly under the closure material. If oxygen was also present in the impurity/air volume exchange, it could also be found on the surface of the pipe under the closure.

(c) When in an oxidized atmosphere, oxidation spreads across the surface of a nonferrous metal in an indiscriminate fashion. Ultimately, Dittmeyer's closure will not prevent oxidized impurities from spreading under the closure, particularly an impurity absorbent closure.

(d) Considering Dittmeyer's closure material was supposedly impregnated with a chemical having the properties of paste flux acid (which in itself may contain oxidized pockets of air), its absorbency capacity was initially limited. This particular limitation renders the infrastructure of the proposed method compromised, and the end product inoperative.

(e) Applicant's prior tests indicate that water condensation tends to form and cause corrosion in the fitting areas of nonferrous pipe where paste flux acid is present on the outer wall, and whereon a gas-impermeable closure is not employed. Since Dittmeyer's closure is absorbent, it does not qualify as gas-impermeable. Absorbent closure material invites hydrogen atoms (from in the air) to join what oxygen is now residual to the pipe wall under the closure. Water condensation on the pipe's outer wall results, and corrosion of the metal begins.

(f) Since no high purity inert gas surrounds the Dirtmeyer fitting before and during formation of that fitting, and no gas-impermeable closure was employed, the Dirtmeyer method does not preclude oxidation of that fitting. The Dittmeyer method produces a moist, nonferrous pipe surface which has no recesses, and that never escapes oxidized contaminants.

OBJECTS AND ADVANTAGES

Several objects and advantages of my invention are listed as follows:

(a) to provide copper pipe nipples having dry surface recesses, saving time and labor;

(b) to provide copper pipe nipples already cut to size, so that no copper pipe goes to waste;

(c) to provide copper pipe nipples that graduate in size (by dimension of length) according to demand on the market;

(d) to provide copper pipe nipples which can easily be mass-produced, keeping them in a competitive price range on the market;

(e) to provide copper pipe nipples that are preserved in a state of material readiness for solder-bonding, while having a structural form which ensures a more reliable solder bond;

(f) to provide copper pipe nipples as an alternative to plumbing contractors in emergency situations.

Using pre-cut and pre-cleaned copper nipples having dry surface recesses will save or create time in emergency situations, or where deadlines exist concerning completion of structural copper piping. The actual fittings will be formed on copper pipe segments using wire brush pipe-cleaning tools that have been modified to be driven by a drill motor. The formation of recesses on the surface of a pipe segment will occur while the segment is surrounded by an inert gas. Gas-impermeable material will be used as a closure to trap the pipe segment having dry surface recesses with (only) the inert gas which is still surrounding the pipe segment. The aforementioned method of manufacturing produces a novel apparatus. The apparatus provides a pipe fitting counterpart that has a structural form which ensures a more reliable solder bond.

Applicant assembled a transparent glove box for processing copper pipe nipples in accordance with the invention. Aforementioned glove box measures 2 feet in height, 2 feet wide, and 4 feet in length. Applicant's glove box is made of ¼-inch sheet acrylic, and is held together with acrylic bonding adhesive. All seams or holes of applicant's glove box are filled at cracks with caulk or sealant, where outside air might otherwise enter. Sheet acrylic, bonding adhesive, and caulk or sealant are available from Plastic Sales, Inc. of San Francisco, Calif.

High purity gas instruments are used to control the atmosphere inside aforementioned glove box. High purity nitrogen gas is present inside aforemention glove box so as to surround a segment of nonferrous metal (copper) pipe also inside aforementioned transparent box, before any fitting section is formed thereon, as part of the invention.

The atmosphere inside aforementioned transparent box is displaced by forcing nitrogen gas into transparent box while there is no drain stopper in drain assembly provided at bottom of aformentioned glove box. Nitrogen gas is released from high purity nitrogen gas cylinder connected to aforementioned glove box with gas pressure regulator and pipe, and pressure therefrom is decreased by aforementioned regulator. Nitrogen gas then passes through gas inlet orifice provided at end of aforementioned pipe. Any gases inside aforementioned glove box, being atomically heavier than nitrogen, are purged from interior of glove box. Gases heavier than nitrogen gas are enhanced by gravity to be exhausted through four-inch sink strainer assembly provided at bottom of applicant's glove box, and sequentially expelled out two-inch pipe assembly connected under aforementioned four-inch strainer assembly.

This purging activity leaves the inner atmosphere of transparent glove box with a nitrogen gas purity content of 99.999 percent. High purity gas and equipment can be found at any welding shop or specialty gas dealer, including Liquid Carbonic Specialty Gas Corporation of San Carlos, Calif.

Left- and right-hand port and glove assemblies are provided on applicant's glove box. Arm ports of applicant glove box are constructed with standard four-inch ABS plastic pipe fittings, consisting of two female couplers joined with two male extensions. Aforementioned fittings are found at plumbing supply shops. Gloves of aforementioned port and glove assembly are made of neoprene rubber, and are each 32 inches in length. Each glove in aformentioned port and glove assembly has a five-inch port entry. Each glove is stretched over one female coupler hub in applicant's port and glove assembly. Neoprene gloves can be found at David Schmidt Co., Inc., of Richmond, Calif.

Cordless drill motor is placed inside applicant's glove box before any purging activity. Applicant places modified wire brush, male-pipe-cleaning tool in chuck of aforementioned drill motor. Applicant will use combination of aforementioned cleaning tool and drill motor to form clean, dry surface recesses on the outer wall of nonferrous metal (copper) pipe, which in purely inert gas-purged atmosphere, as part of the invention. Aforementioned cleaning tool is modified as follows:

Acquire one nominal half-inch, hand-held, plastic-housed wire brush, male-pipe-cleaning tool. Also acquire one quarter-20 by two and a half-inch long, round-head (slotted or phillips) stove bolt. Acquire two quarter-20 nuts and three quarter-inch lock washers (external tooth).

Take stove bolt and slip it through one lock washer. Lock washer will be positioned next to head on bolt. Insert bolt through open face of pipe-cleaning tool, and then as far as possible through smaller hole on backside of tool. This will position lock washer and head of bolt inside cleaning tool, beyond wire brush, and against backside, as you are looking into open face of tool.

Next, add one lock washer, one quarter-20 nut, another lock washer, and one (last) quarter-20 nut onto threaded body of bolt, on backside of cleaning tool. Add aformentioned things in that order, and tighten both nuts snugly to where the bolt will not slip or turn freely, without wire brush cleaning tool also turning. Modification of pipe-cleaning tool is now complete.

The procedure for forming recess fitting sections on surface of aforemention pipe segment using drill motor and aforementioned cleaning tool in an inert (nitrogen) gas atmosphere of glove box in accordance with the invention, is performed as follows:

Any stoppers are removed from drain assembly when opening any valve on high purity nitrogen gas cylinder, and high purity nitrogen gas is purged into glove box. High purity nitrogen gas then surrounds everything in glove box. Manual access into glove box is gained by donning gloves of port and glove assembly provided.

Next, one picks up and holds center of segment surface with one hand, while holding drill motor in the other hand. One end of aforementioned segment surface is then pushed into open face and wire brush portion of cleaning tool, while slowly depressing trigger switch of drill motor, which has been set to operate in the reverse mode. One then allows cleaning tool to rotate at a low-to-medium speed, for a period of four to five seconds. While drill motor is running, one manually pulls on center of segment surface, and recess fitting section appears adjacent to undisturbed segment surface, upon separation from cleaning tool. Any difference in caliber of undisturbed segment surface and recess fitting section is not normally detectable to the naked eye. However, recess fitting section is clean, xerotic, and non-oxidized as viewed adjacent and juxtaposed to undisturbed segment surface. Forming two recess fitting sections on opposite ends of outer wall surface of aforementioned pipe segment effectively creates a copper pipe nipple.

A copper pipe nipple having clean, xerotic surface recess fitting sections is surrounded with an inert (nitrogen) gas, so as to preclude oxidation of aforementioned fitting sections, as part of the invention.

Impulse heat-sealer rests on floor of glove box before manufacture of inventive apparatus begins. Pipe segment and gas-impermeable bag rest on floor of glove box before manufacture of inventive apparatus begins. Heat-sealer is used manually to seal and effectively confine a copper pipe nipple having two clean, xerotic recess fitting sections on aforementioned outer wall surface, while surrounded with only high purity inert (nitrogen) gas, inside gas-impermeable bag, as part of the invention. Heat-sealers and gas-impermeable plastic bags can be found at Mainprice Plastics, Inc., of San Leandro, Calif.

Standard three and three quarters of an inch test plug seals access hole in top of glove box. Test plug provides access to invention apparatus after manufacture. Test plug is removed from three and three quarters of an inch hole in glove box by loosening wing nut on top of test plug. Operation:

Consumers need only to remove the nipple from an air-tight container, and then place it in its respective position adjoining corresponding female fittings, apply paste flux to clean fittings where necessary, and add molten solder to bond the fittings at the joint.

No cutting of pipe is necessary. No marring, scratching, or rubbing of the pipe segment with abrasive material is necessary. Since the nipple itself has a physical structure which ensures a reliable textural integration when bonded to corresponding fittings using molten solder, the ready-to-use copper pipe nipple apparatus can be used with confidence.

SUMMARY, RAMIFICATIONS, SCOPE

Accordingly, the reader can now see how the existence of a ready-to-use copper pipe nipple apparatus will provide a great deal of convenience to laborers in the plumbing trade. There is always a certain percentage of the plumbers and general contractors at work who need to save some time and labor. The provision of a pipe segment having clean, dry surface recess fitting sections that have precluded oxidation by use of a high purity inert gas, all of which are preserved and protected by gas-impermeable closure material, can help save time in vital emergency situations. The ready-to-use copper pipe nipple apparatus can enable laborers to get a job done by a definite schedule or deadline. The ready-to-use copper pipe nipple apparatus is a real time saver.

The invention introduces a nonferrous, inert gas-precluded-oxidation pipe apparatus. The ready-to-use copper pipe nipple apparatus is a useful embodiment of the invention.

Although the description contains certain specificities, these should not be interpreted as limiting the scope of the invention, but as providing an understanding of one specific embodiment of the invention.

The scope of the invention should be determined by full consideration of all claims and their legal equivalents.

I claim:

1. A ready-to-use pipe nipple apparatus comprising:

a segment of pipe of a nonferrous, oxidizable metal, said segment having two end sections and an undisturbed center section on its outer wall, each of said end sections being clean, xerotic surface recesses which are free of oxidation, impurities, and contaminants, a gas-impermeable bag surrounding and containing said segment of pipe, said bag defining a volume which surrounds said segment of pipe so that said pipe and said volume are within said bag, and an inert gas purging said volume and thereby surrounding said segment of pipe so as to preclude oxidation of said end sections, thereby preserving the clean, xerotic, non-oxidized, and uncontaminated status of said end sections.

2. A ready-to-use pipe nipple apparatus comprising:

a segment of rigid pipe of a nonferrous, oxidizable metal, said segment having two clean, xerotic, non-oxidized surface recess sections on its outer wall, said recess sections being free of impurities and contaminants, while both of said two sections are on opposite ends of an undisturbed center section of said wall, a gas-impermeable container surrounding said segment of pipe, said container defining a volume of gas which surrounds said segment so that said segment and said volume are within said container, and gas other than oxygen purging said volume and thereby surrounding said segment of pipe so as to preclude oxidation of said recess sections, said recess sections thereby preserved in a state of reliable material readiness for future use.

3. A ready-to-use pipe nipple apparatus comprising:

a segment of pipe of a nonferrous, oxidizable metal, said segment of pipe having two surface recess fitting sections on its outer wall, said fitting sections being clean, xerotic, and free of oxidation and impurities, while both of said two fitting sections are in juxtaposition to an undisturbed center section of said wall, an airtight container defining a volume of gas which surrounds said segment of pipe so that said segment and said volume are within said container, and an inert gas purging said volume and thereby surrounding said segment of pipe so as to preclude oxidation of said fitting sections, said fitting sections thereby preserved for future use.

\* \* \* \* \*